United States Patent Office 3,170,959
Patented Feb. 23, 1965

3,170,959
ALLYLOXYMETHYL DIAROMATIC ETHERS
Walter B. Trapp, Midland, Mich., assignor to The Dow Chemical Company, Midland, Mich., a corporation of Delaware
No Drawing. Filed May 1, 1961, Ser. No. 106,532
6 Claims. (Cl. 260—613)

The present invention concerns novel organic compounds. In particular, it relates to novel allyloxymethyl diaromatic ethers corresponding to the general formula:

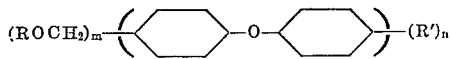

wherein R is an allyl or 2-methylallyl radical, R' is an alkyl, alkoxy or halogen radical wherein the alkyl group contains from 1 to 4 carbon atoms, m is an integer from 1 to 3 and n is an integer from 0 to 2.

Illustrative of the invention are such compounds as para-allyloxymethyl diphenyl oxide, para-(2-methylallyloxymethyl)diphenyl oxide, ortho-allyloxymethyl di(parachlorophenyl)oxide, 4,4' - di(allyloxymethyl) di(orthobromophenyl)oxide, 2,4'-di(allyloxymethyl) diphenyl oxide, 2,4,4'-tri(allyloxymethyl)diphenyl oxide, 2,2',4'-tri(allyloxymethyl)diphenyl oxide, 4,4'-di(allyloxymethyl) di(orthotolyl)oxide, 2,2'-di(2-methylallyloxymethyl) di(parabutylphenyl)oxide, 2,2'-di(2-methylallyloxymethyl) di(parabutoxyphenyl)oxide and the like.

The novel allyloxymethyl diaromatic ethers of the present invention are viscous liquids soluble in many organic solvents such as acetone, dimethyl formamide, dioxane, lower alkanols and the like. The compounds are useful as insecticides and fungicides and are readily adaptable for employment as toxic constituents of compositions for the control of insects and fungi in agronomic practices. Moreover, when heated in the presence of a Friedel-Crafts catalyst such as zinc chloride, aluminum chloride or sulfuric acid, the compositions of the invention condense to provide thermoset resins useful as molding and binding compositions. These resins can be utilized for such purposes with or without an inert filler such as is commonly used.

The compounds of the present invention are prepared by condensing allyl alcohol or 2-methylallyl alcohol with a suitable halomethylated diaromatic ether in the presence of an alkali hydroxide. To carry out the reaction, the halomethylated diaromatic ether is added to a mixture of the alkali hydroxide and the allyl alcohol at an elevated temperature of at least about 60° C. under autogenous or atmospheric pressures. Reactions can be conducted at higher temperatures, e.g., up to about 300° C., if provision is made for adequate removal of exothermic heat of reaction. The reflux temperature of the mixture under atmospheric pressure is preferred. As the halomethylated ether is added to the alcohol-alkali mixture, the exothermic effect occurring is sufficiently pronounced that care should be exercised to avoid adding the ether too rapidly. At least enough of the alcohol is employed to react stoichiometrically with each available halomethyl moiety in the ether composition added. Preferably about 2 up to about 10 moles of the alcohol are employed for each chemical equivalent of the halomethyl moiety. The amount of the alkali hydroxide employed can vary widely from a minimum of about one mole of the hydroxide for each chemical equivalent of the halomethyl moiety present up to substantially larger amounts. There is no critical upper limit other than a practical one based on economic considerations. A preferred alkali hydroxide to organic halogen content on a molar basis is 1.05 moles of the former to 1 molecular equivalent of the latter.

In an improved variation of the foregoing preparative procedure, the halomethylated diaromatic ether is dissolved in a portion of the alcohol with which it is to be reacted and the resulting solution is added to the heated alcohol-alkali mixture. Still another mode of operation involves the use of a non-reactive organic solvent, e.g., dioxane, as an inert reaction medium. Upon completion of the addition of the halomethylated ether to the reaction system, the entire reaction mass is maintained at an elevated temperature, e.g., the reflux temperature of the reaction mass, for an extended period of time. While an effective amount of the desired product can be obtained within a few minutes of the initial contacting of the reactants, it is usually desirable to continue the reaction conditions for as much as several hours, in order to insure that a substantial proportion of the reactants is converted to the desired product. The latter is especially true if batch reaction techniques are being employed but, as will be readily apparent to one skilled in the art, continuous processes in which the unreacted ingredients are continuously recovered and recycled to the reaction zone feed streams may utilize comparatively short contact times for effective operation.

The halomethylated diaromatic ethers utilized as starting materials in the above reaction are known. They are obtained as reaction products of the chloromethylation or bromomethylation of diphenyl oxide and alkyl, alkoxy or halo substituted diphenyl oxides, and generally correspond to the formula:

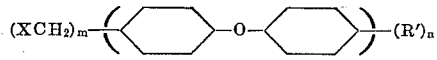

wherein the symbols R', m and n are as above defined and X is selected from the group consisting of chlorine and bromine. Methods for their preparation are disclosed in United States Letters Patent 2,911,380. Specific halomethylated diaromatic ethers that can be employed in the invention include para-chloromethyl diphenyl oxide, 4,4'-di(chloromethyl)diphenyl oxide, 2,4,4'-tri(chloromethyl)diphenyl oxide, para-bromomethyl diphenyl oxide, 2,4'-di(bromomethyl)diphenyl oxide, 2,2',4'-tri(bromomethyl)diphenyl oxide, para-chloromethyl ditolyl oxide, 4,4' - di(chloromethyl)ditolyl oxide, 2,4,4' - tri(chloromethyl)ditolyl oxide, para-chloromethyl di(ortho-ethoxyphenyl) oxide, para-chloromethyl di(meta-butoxyphenyl) oxide, 2,2'-di(chloromethyl) di(para-butylphenyl) oxide, 2,4,4'-tri(bromomethyl) di(meta-butylphenyl) oxide, 4,4'-di(chloromethyl) di(ortho-ethylphenyl) oxide, 2,2'-di(chloromethyl) di(para-chlorophenyl) oxide and the like mono-, di- and trihalomethylated diaromatic ethers. As prepared, the above halomethylated diaromatic ethers are usually contained in product mixtures which may consist of several halomethyl derivatives of the particular diaromatic ether employed in the halomethylation reaction. Such reaction products are separated into the individual constituents thereof by such means as fractional distillation at moderate temperatures under reduced pressures. Separatory procedures unique to the 4,4'-di(halomethyl)-diphenyl oxides are set forth in a copending application Serial No. 801,986, filed March 26, 1959, now issued as U.S. Patent No. 3,004,072. The highest proportions of monofunctional halomethylated ethers are obtained in those product mixtures prepared by conducting the halomethylating reaction for a relatively short time. Longer reaction times tend to give a relative predominance of the materials of higher functionality. Compositions consisting essentially of mono-, di- or trihalomethylated diaromatic ethers or mixtures thereof can also be employed in the invention to prepare the corresponding allyloxymethyl ether compositions which can then be separated into the individual constituents by fractional distillation under reduced pressures.

In a representative operation, 580 grams of allyl alcohol and 200 grams of sodium hydroxide, 670 grams of 4,4'-dichloromethyl diphenyl oxide and 500 grams of dioxane were added to a three liter glass flask equipped with a reflux condenser, stirrer and dropping funnel. The resulting mixture was heated to its reflux temperature and the reaction continued for about 2 hours. The reaction mixture was then cooled and the precipitated sodium chloride separated therefrom by filtration. Residual dioxane and allyl alcohol were removed from the filtrate by heating it to a temperature of about 100° C. under a reduced pressure of about 100 millimeters of mercury. The filtrate was then further purified by distilling it in a modified "Hickman type" molecular still. The fraction, boiling from about 80° to 90° C. under an absolute pressure ranging from 1 to 5 microns of mercury, weighed 371 grams. It was characterizable as a water-clear liquid having a refractive index, $n_D^{25}$ of 1.5518. The product thus obtained was 4,4'-di(allyloxymethyl)diphenyl oxide.

In a manner identical to the above operation, 4,4'-di(2-methylallyloxymethyl)diphenyl oxide was prepared by substituting 2-methylallyl alcohol for the allyl alcohol employed above. 4,4' - di(2 - methylallyloxymethyl)diphenyl oxide thus prepared boiled at 110°–115° C. at absolute pressures of 1 to 10 microns of mercury. The compound had a refractive index, $n_D^{25}$, of 1.5451.

In a manner similar to that of the foregoing, other similar allyloxymethyl and 2-methylallyloxymethyl derivatives of diaromatic ethers are prepared by substituting for the 4,4'-di(chloromethyl)diphenyl oxide employed above, such diaromatic ethers as para-chloromethyl diphenyl oxide, 4,4'-di(chloromethyl)diphenyl oxide, 2,4,4' - tri(chloromethyl)diphenyl oxide, para-bromomethyl diphenyl oxide, 2,4'-di(bromomethyl)diphenyl oxide, 2,2',4' - tri(bromomethyl)diphenyl oxide, para-chloromethyl ditolyl oxide, 4,4'-di(chloromethyl)ditolyl oxide, 2,4,4'-tri(chloromethyl)ditolyl oxide, para-chloromethyl di(ortho-ethoxyphenyl) oxide, para-chloromethyl di(meta-butoxyphenyl) oxide, 2,2' - di(chloromethyl) di(para-butylphenyl) oxide, 2,4,4' - tri(bromomethyl) di(meta-butylphenyl) oxide, 4,4'-di(chloromethyl) di(ortho-ethylphenyl) oxide, 2,2' - di(chloromethyl) di(para-chlorophenyl) oxide and the like mono-, di- and trihalomethylated diaromatic ethers.

The new allyloxymethyl diaromatic ethers of the invention are useful as toxic constituents in compositions for the control of insects and fungi. In such applications, the above products may be dispersed on inert finely divided solids and employed as dusting agents. In other modes of operation, the compositions can be dispersed in water with the aid of a wetting agent and the resulting aqueous suspension employed as a spray. In still other operations, the compounds may be dissolved in suitable organic solvents and the resulting composition employed directly or as a component of an oil-in-water or water-in-oil emulsion to obtain a composition that may be utilized as a spray, drench or wash.

In a representative operation, an aqueous dispersion containing 600 parts per million of 4,4'-di(allyloxymethyl)diphenyl oxide was sprayed on young tomato plants until the leaves were thoroughly wetted. The sprayed plants were then allowed to dry and subsequently inoculated with an aqueous suspension of the spores of *Alternaria solani*. For purposes of comparison, control plants that had not been treated with the above fungicidal composition were likewise inoculated with the fungus. After inoculation, the plants were incubated for about 24 hours at about 71° F. and 100 percent relative humidity. Thereafter, the plants were maintained under normal growing conditions until a later date when the disease had fully developed in the inoculated control plants. A comparison of the control plants with those which were initially treated with the fungicidal composition of the invention indicated that about 65 percent control of the disease was obtained.

In another operation, application to a population of young bean plants of an aqueous dispersion containing 4,4'-di(allyloxymethyl)diphenyloxide as the sole toxicant in a concentration of 0.12 part per 100 parts of water, gave the bean plants 70 percent protection from the larvae of the Mexican bean beetle, *Epilachna varivestis*. The test was conducted by momentarily dipping the young bean plants in the foregoing insecticidal dispersion and after drying, placing 10 Mexican bean beetle larvae on each host plant. Mortality checks were made after about 5 days, the plants having been maintained at a temperature of about 70° F. For contrast, a control group of bean plants was identically infected with the bean larvae except that they were not treated with the compound of the invention. In this group, the bean beetle larvae continued to thrive with no reduction in numbers of live beetle larvae.

What is claimed is:

1. A composition of matter selected from the group consisting of para-allyloxymethyl diphenyl oxide, para-2-methylallyloxymethyl diphenyl oxide, 4,4'-di(allyloxymethyl) diphenyl oxide, 4,4'-di(2-methyl-allyloxymethyl) diphenyl oxide, 2,4'-di(allyloxymethyl) diphenyl oxide.
2. Para-allyloxymethyl diphenyl oxide.
3. Para-2-methylallyloxymethyl diphenyl oxide.
4. 4,4'-di(allyloxymethyl)diphenyl oxide.
5. 4,4'-di(2-methylallyloxymethyl)diphenyl oxide.
6. 2,4'-di(allyloxymethyl)diphenyl oxide.

References Cited in the file of this patent

UNITED STATES PATENTS

| | | |
|---|---|---|
| 2,170,809 | Coleman et al. | Aug. 29, 1939 |
| 2,170,989 | Coleman et al. | Aug. 29, 1939 |
| 2,493,711 | Britton et al. | Jan. 3, 1950 |
| 2,821,551 | Katzschmann | Jan. 28, 1958 |
| 2,875,251 | Rigterink | Feb. 24, 1959 |
| 2,881,150 | Jaruzelski | Apr. 7, 1959 |